United States Patent [19]

Koci et al.

[11] 4,105,401

[45] Aug. 8, 1978

[54] DYE PREPARATION SOLUBLE IN COLD WATER

[75] Inventors: Zdenek Koci, Binningen; Hans Mollet, Reinach, both of Switzerland

[73] Assignee: Ciba-Geigy Corporation, Ardsley, N.Y.

[21] Appl. No.: 677,945

[22] Filed: Apr. 19, 1976

[30] Foreign Application Priority Data

Apr. 23, 1975 [CH] Switzerland .................. 5201/75

[51] Int. Cl.² ............................................ C09B 67/00
[52] U.S. Cl. ................................................ 8/79; 8/1 W; 8/41 R; 8/86; 8/89 R; 8/90; 8/92; 8/93
[58] Field of Search ............... 8/1 S, 1 L, 79, 86, 8/89 R, 90, 92, 93, 1 W

[56] References Cited

U.S. PATENT DOCUMENTS

| 1,963,967 | 6/1931 | Hermann | 8/88 |
|---|---|---|---|
| 2,121,616 | 6/1938 | Werntz | 8/90 |
| 2,121,617 | 6/1938 | Werntz | 8/90 |
| 2,321,501 | 6/1943 | Miller | 8/62 |
| 3,617,176 | 12/1971 | Machatzke | 8/42 |
| 3,671,176 | 6/1972 | Kaufmann et al. | 8/39 |

FOREIGN PATENT DOCUMENTS 2,317,175  10/1973  Fed. Rep. of Germany.
906,807  9/1962  United Kingdom.

OTHER PUBLICATIONS

Zimmerman and McLeary, American Dyestuff Reporter, Jan. 26, 1948, pp. 47–51 and 56.
Bird, "The Theory and Practice of Wool Dyeing" (SDC. Dyers and Colourists, 1963)-pp. 74; 174–179.
Diserens, "The Chemical Technology of Dyeing and Printing" (Reinhold, 1948), pp. 8–11.

*Primary Examiner*—A. Lionel Clingman
*Attorney, Agent, or Firm*—Edward McC. Roberts; Prabodh I. Almaula

[57] ABSTRACT

Disclosed is a solid preparation containing at least one anionic dye or optical brightener, at least one anionic compound having hydrotropic activity, and/or at least one anion-active solubilising agent as well as optionally further additives, such as and preferably a anti-dust agent, whereby this preparation has a very good solubility especially in cold water compared with that of equally strong dyes diluted with customary fillers and can be used for producing aqueous dye preparations usefull for dyeing and printing materials dyeable with anionic dyes or optical brighteners.

11 Claims, No Drawings

DYE PREPARATION SOLUBLE IN COLD WATER

The invention relates to a dye preparation soluble in cold water, to processes for producing the preparation, as well as to the use thereof for preparing dye liquors and printing pastes and to the use of these for dyeing and printing the widest variety of materials.

Most dyes are marketed in the form of finely ground powders. In order to prepare a dye liquor with such dyes they have to be dissolved in most cases with vigorous stirring and at elevated temperature — usually up to the boiling point of the stock solution — for a certain time in water, since the dyes are inadequately soluble in cold water, with very often unwettable lumps of dye forming, which are difficult to dissolve; there are then required either special high-speed stirring devices or a long stirring time to get such lumps of dye again into solution.

One possibility of improvement of the cold-water solubility of dyes is the formulation, for example according to US-PS 3,617,176, of 1:2-metal-complex dyes by the dry dilution of dye with trisodium phosphate or tripotassium phosphate and, optionally, with a further anion-active dispersing agent; however, these solid preparations often have the disadvantage that the wettability of the dyes is insufficient owing to the formation of lumps.

Furthermore, it is known from GB-PS 906,807 that the water-solubility of 1:2-metal-complex dyes can be improved by the addition of nonionic dispersing agents and anion-active aromatic aminosulphonates. The disadvantage of these formulations is, however, that the applied dispersing agents have a low melting point, a factor which causes difficulties in drying or renders economical spray-drying even impossible.

In order to overcome these disadvantages, it has finally been suggested to market the dyes in liquid form. But these liquid formulations too have disadvantages, for example with regard to stability and storage, and with regard to the maximum obtained tinctorial strength, the volatility, toxicity and inflammability, just to mention a few of the disadvantages.

It has now been found that the above-mentioned disadvantages can be eliminated and an improved water-solubility, especially cold-water solubility, of anionic dyes can be obtained by dissolving the anionic dyes, preferably in the form of a dye suspension, in water at a pH-value of 4.5 to 11.5, at a temperature of about 20° to 95° C, together with at least one anionic compound having hydrotropic activity and/or an anion-active solubilising agent and, if required, further additives; and, optionally, allowing this dye solution to cool and then drying it. Drying can be carried out, for example, in a conventional spray-dryer or in a drying chamber; and in the case of the latter method the dried product can, if necessary, be further reduced in size by mechanical means. It is however also possible to produce the dye preparations of the invention by mixing and/or grinding of the anionic compounds having hydrotropic activity and/or anion-active solubilising agents with the dye and, optionally, further additives.

The anionic dyes concerned are water-soluble dyes wherein water-solubility is achieved as a result of, for example, substituents which produce water-solubility and/or as a result of metal-complex formation.

Such substituents producing water-solubility are, for example, the carboxylic acid group, the phosphoric acid group and, in particular, the sulphonic acid group. With regard to metal-complex formation, suitable metal-complexes are, for example, 1:1- or 1:2-metal-complex dyes, such as 1:1-nickel complexes, 1:1-cobalt complexes, 1:1-copper complexes or 1:1-chromium complexes, or symmetrical or asymmetrical 1:2-cobalt complexes or 1:2-chromium complexes of, in particular, o-carboxy-o'-hydroxy dyes or o,o'-dihydroxyazo dyes of the benzene-azo-benzene, naphthalene-azo-naphthalene, benzene-azo-naphthalene, benzene-azo-pyrazole or benzene-azo-acetoacetic acid amide type.

Considered chemically, suitable acid dyes are, for example, phthalocyanine, nitro, di- or triaryl-methane-, oxazine, thiazine, dioxazine, xanthene and anthraquinone dyes and, preferably, azo dyes of the monoazo, diazo and polyazo series. It is understood that these dyes can additionally contain in the molecule fibre-reactive groupings, and that also mixtures of dyes can be used according to the invention. By anionic dyes are meant also anionic optical brighteners, such as derivatives of 4,4'-bis(triazinylamino)-stilbene-2,2'-disulphonic acid, 4,4'-bis(v-triazol-2-yl)-stilbene-2,2'-disulphonic acids, 4,4'-distyryl-diphenyl-mono- and -disulphonic acids, stilbenenaphthotriazole-mono- and -disulphonic acids and derivatives of pyrazolinesulphonic acids and naphthalimide-sulphonic acids.

These dyes and optical brighteners can be added, for example, as dried product or as press cake, or preferably from the last synthesis step directly from the solution, dispersion or suspension before isolation, such as after completed coupling or metal complexing.

As anionic compounds having hydrotropic activity there are used those of the general formulae I, II and III

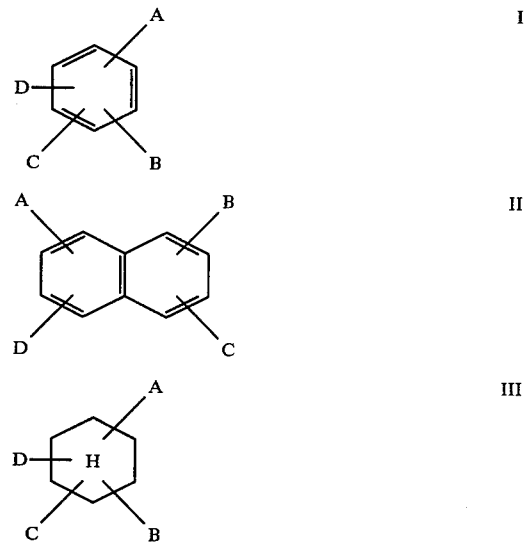

wherein

A, B, C and D represent at most three hydrogen atoms, and the other symbols represent, independently of each other, $SO_3Na(K)$, $COONa(K)$, OH, $NO_2$, or straight-chain or branched-chain alkyl ($C_1$–$C_9$). The following compounds may for example be mentioned: toluene, o-, m-, p-xylene- and cumenesulphonate, naphthalene-1- or -2-sulphonate, benzoate, or p-nitrobenzoate; salicylate or 3-hydroxy-2-naphthoate, with preferably the alkali salt, such as sodium salt or ammonium salt, being concerned. It is also possible to use mixtures of such anionic compounds having hydrotropic activity. Particularly preferred compounds are xylene sulphonate, benzoate, cumene sulphonate and 3-hydroxy-2-naphthoate.

As anionic solubilising agents there are used, e.g., alkali metal salts, such as sodium, potassium or ammonium salts of N-(1,2-dicarboxyethyl)-N-octadecylsulphosuccinamate, N-alkyl-($C_{12}$-$C_{18}$)-sulphosuccinamate, alkyl-($C_{12}$-$C_{18}$)-imidazolinedisulphonate, 1-benzyl-2-heptadecyl-benzimidazolemono- or -disulphonate, alkyl-($C_9$-$C_{18}$)-benzenesulphonate, alkyl-($C_8$-$C_{18}$)-sulphate, alkyl-($C_8$-$C_{18}$)-ethylene glycol ether(1–100 moles of ethylene oxide)-sulphate, olefin-($C_8$-$C_{18}$)-sulphonate, alkyl-($C_8$-$C_{20}$)-sulphonate and mono- and dialkylsulphosuccinate of the general formula

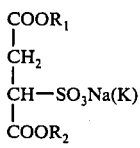

wherein $R_1$ represents alkyl-($C_4$-$C_{18}$), Na, K and $R_2$ represents alkyl-($C_4$-$C_{18}$), $CH_2$—$CH_2$—($CH_2CH_2O$)$_n$-alkyl-($C_8$-$C_{18}$), $n$ = 1–200, —$CH_2CH_2NHCO$-alkyl-($C_8$-$C_{18}$), saturated or unsaturated.

It is however also possible to use mixtures of such anionic solubilising agents. Dodecylbenzenesulphonate and N-(1,2-dicarboxyethyl)-N-octadecylsulphosuccinamate are particularly effective compounds.

Besides the compounds having a hydrotropic and/or solubilising action usable according to the invention, there may be used further additives, such as various fillers, e.g. cerelose, dextrin, glucose, raw sugar, D-mannitol, Na-salt of dinaphthylmethanedisulphonate, lignin sulphonates, lactose or pentaerythrite, which are used to obtain the desired dye concentration; as well as defoaming agents and anti-dust agents.

In order to render these dye preparations non-dusty, it is advantageous to treat them by mixing them with or spraying them with alkyl halides liquid at normal temperature of the general formula

wherein R = straight-chain or branched-chain alkyl ($C_5$-$C_{30}$), Hal = Cl, F, Br and $n$ = 1 to 3, in amounts of 0.2 to 10 percent by weight, relative to the dye powder. These are, in particular, alkyl chlorides, such as lauryl to octadecyl chloride. It has been shown that with these compounds there is achieved an effective anti-dust effect, and that also the wettability and rate of dissolving in water of the dye preparations of the invention can be additionally increased. This anti-dust effect can however also be obtained by adding to the dye preparations 0.2 to 10 percent by weight of an anti-dust mixture consisting of 70 to 99.9 percent by weight of a conventional anti-dust agent, e.g. based on mineral oil, and 0.1 to 30 percent by weight of a compound enhancing wettability, with suitable compounds enhancing wettability being, for example: dialkylsulphosuccinates of the general formula

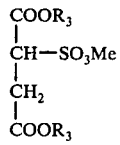

wherein the $R_3$'s represent, independently of one another, alkyl ($C_8$-$C_{12}$) and Me is Na, K, $NH_4$, mono-, di- or trialkanolamine ($C_2$-$C_3$); or fluorine-containing anion-active and/or nonionic surface-active agents such as Monflor surface-active agents (ICI, England), e.g. Monflor 32 and 52, and Zonyl surface-active agents (DuPont, USA), e.g. Zonyl FSN.

With these agents too there is obtained a good anti-dust effect and an improved wettability in water.

Lauryl chloride has proved to be particularly effective as an anti-dust agent.

There are obtained in this manner anionic dye preparations and optical-brightener preparations preferably composed of:

a. 1 to 95 percent by weight of at least one anionic dye or optical brightener, b. 5 to 99 percent by weight of at least one anionic compound having hydrotropic activity, and/or at least one anion-active solubilising agent, as well as c. optionally further additives.

These new dye preparations are characterised by a very good solubility in water, particularly in cold water as well as in hot water, compared with that of equally strong dyes diluted with customary fillers such as Glauber's salt, sodium chloride, dextrin and lignin sulphonates; by a very high rate of dissolving; and by a very good wettability in water. At the same time, the solubility of dyes insufficiently soluble is improved.

These dye preparations according to the invention are suitable for producing aqueous dye preparations or preparations for optical brightening which can be used for dyeing and printing or optically brightening materials dyeable with anionic dyes or optical brighteners, as well as for producing detergents containing optical brighteners.

The following Examples serve to illustrate the invention without the invention being limited by them. Parts by weight are given as 'parts' and temperatures are expressed in degrees Centigrade.

In order to determine the solubility in cold water, there is put into a beaker in each case 200 ml of water (20° C), and there are then added, while stirring with a magnetic stirrer (750 r.p.m.), equal amounts respectively of the preparation and of the identical dye diluted with the usual fillers. After the preparation and the dye, respectively, have been added, the solutions obtained are each stirred for 2 minutes at 20° C (750 r.p.m.). Each solution is then filtered by means of a paper filter (SS 1450 CV $\phi$ 7 cm), and this is subsequently rinsed with 50 ml of water. The solubility in cold water is expressed as the concentration in g/l at which there remain(s) after filtration no filter residue or no unwetted lumps or specks of dye on the filter paper.

EXAMPLE 1

200 parts of an aqueous suspension with a pH-value of 9 containing as dye the 1:2-Cr-complex formed from the constituents

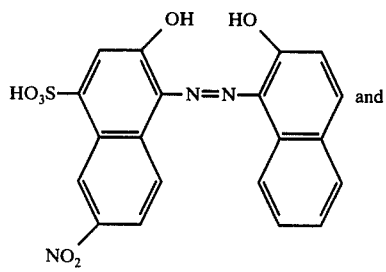

and

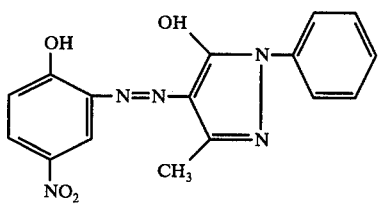

are heated with stirring to 80°, and in this solution there are dissolved 13 parts of xylenesulphonic acid (Na salt). After 10 minutes' stirring at 80°, the solution is slowly cooled to 40°, and dried in a spray dryer (160° air-inlet-temperature, 80° to 90° air-outlet temperature). The dye powder obtained is then rendered non-dusty by being sprayed with 2 percent by weight of lauryl chloride as anti-dust agent. There is thus obtained a solid, non-dusty dye powder consisting of 56 percent by weight of the dye given above and 42 percent by weight of xylenesulphonic acid (Na salt) and 2 percent by weight of lauryl chloride, which dye powder is very readily soluble in cold water (40 g/l at 20° compared with 5 g/l at 20° for the dye diluted with the conventional fillers) and has good wetting properties.

EXAMPLE 2

If there are added to the aqueous suspension according to Example 1 not 13 parts of xylenesulphonic acid (Na salt) but 13 parts of sodium benzoate with stirring at 85°, the solution then being stirred for 5 minutes at 80°, subsequently slowly cooled to 40° and afterwards sprayed and rendered non-dusty in an analogous manner, then likewise there is obtained a dye powder having good solubility in cold water (50 g/l at 20° compared with 5 g/l at 20° for the dye diluted with conventional fillers), composed of 56 percent by weight of the dye according to Example 1, 42 percent by weight of sodium benzoate and 2 percent by weight of lauryl chloride.

EXAMPLE 3

If, instead of 13 parts of xylenesulphonic acid (Na salt), 37.2 parts of a 35% aqueous solution of tetra-Na-salt-N-(1,2-dicarboxyethyl)-N-octadecylsulphosuccinamate are added, with stirring at 80°, to the aqueous suspension according to Example 1, and stirring is continued for about 10 minutes at 80°, with the solution being subsequently slowly cooled to about 40° and dried in a spray-dryer (airinlet temperature 160°/air-outlet temperature 80° to 90°), the dye powder finally being rendered non-dusty with 2 percent by weight of a mixture of 99 percent by weight of mineral oil and 1 percent by weight of a dissolved surface-active agent (Zonyl FSN) containing fluorine, then there is obtained a non-dusty dye powder composed of 56 percent by weight of the dye according to Example 1, 42 percent by weight of tetra-Na-salt-N-(1,2-dicarboxyethyl)N-octadecyl-sulphosuccinamate and 2 percent by weight of a mixture of 99 percent by weight of mineral oil and 1 percent by weight of Zonyl FSN, which dye powder is very readily soluble in cold water (60 g/l at 20° compared with 5 g/l at 20° for the dye diluted with conventional fillers) and is easily wetted.

EXAMPLE 4

200 parts of an aqueous suspension with a pH-value of 11.5 containing the Co-mixed complex of the constituents

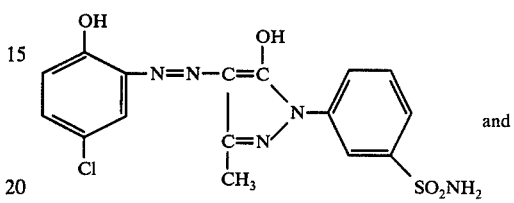

and

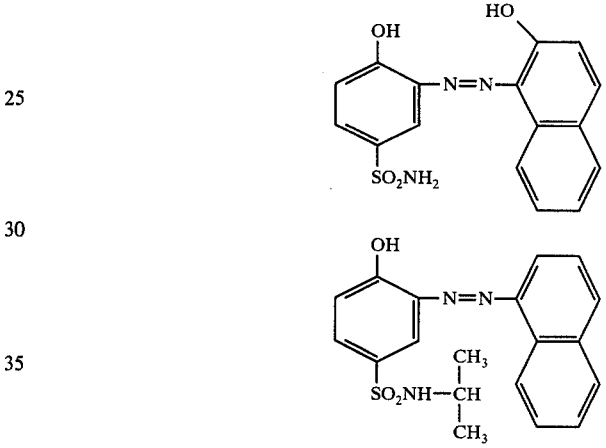

are heated with stirring to 90°, and in the solution obtained there are dissolved 10.5 parts of sodium cumene sulphonate. After 10 minutes' stirring at 80°, the solution is dried in a drying chamber in 12 hours at 110°. The dried product is then ground to powder and subsequently rendered non-dusty with 1 percent by weight of lauryl chloride. There is obtained a dye powder consisting of 65 percent by weight of the dye, 34 percent by weight of sodium cumene sulphonate and 1 percent by weight of lauryl chloride, which dye powder dissolves very readily in cold water (50 g/l at 20° compared with <5 g/l at 20° for the dye diluted with the usual fillers) and is easily wetted in water.

EXAMPLE 5

If there are added to the aqueous suspension according to Example 4, at 80° with stirring, 10.5 parts of the sodium salt of 3-hydroxy-2-naphthoic acid instead of 10.5 parts of sodium cumene sulphonate, the solution being slowly cooled after 10 minutes' stirring at 80° to 40°, then spraydried in a spray-dryer (air-inlet temperature 160°/airoutlet temperature 80° to 90°), and afterwards rendered nondusty with 1 percent by weight of lauryl chloride, then there is obtained a dye powder composed of 65 percent by weight of the dye and 34 percent by weight of the sodium salt of 3-hydroxy-2-naphthoic acid and 1 percent by weight of lauryl chloride, which dye powder has good solubility in cold water (30 g/l at 20° compared with >5 g/l at 20° for the dye diluted with conventional fillers) and is characterised by good wettability in water.

EXAMPLE 6

200 parts of an aqueous suspension containing the 1:2-chromium-complex dye from

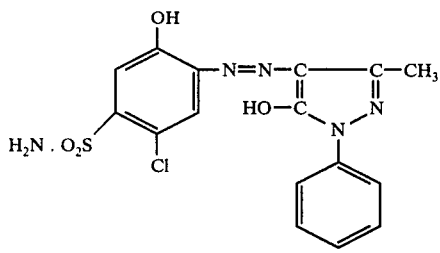

are firstly brought to a pH-value of 10 with 2 parts of conc. NaOH 36° Bé and then heated to 80°. There are then dissolved in this solution at 80°, with stirring, 3.4 parts of sodium benzoate and 0.6 part of Na-dodecylbenzenesulphonate. After being stirred for 10 minutes, the solution is slowly cooled to 40° and dried in a spray-dryer (air-inlet temperature 160°/air-outlet temperature of 80° to 90°). The dye powder is subsequently rendered non-dusty by being sprayed with 3 percent by weight of lauryl chloride as an anti-dust agent. There is obtained a non-dusty dye powder composed of 87.1 percent by weight of the dye, 8.4 percent by weight of sodium benzoate, 1.5 percent by weight of Na-dodecylbenzenesulphonate and 3 percent by weight of lauryl chloride, which dye powder is very rapidly wetted and is very readily soluble in cold water (>30 g/l at 20° compared with 15 g/l at 20° for the dye diluted in the normal manner).

EXAMPLE 7

In 1200 parts of warm water there are dissolved at 80° 117.3 parts of the dye of the formula

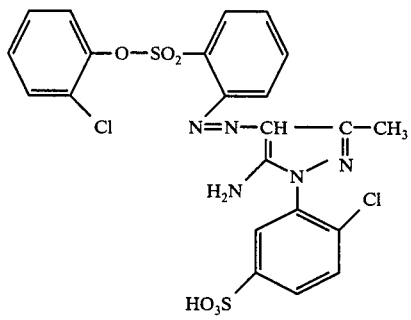

and the solution is brought to pH 10 with 6 parts of conc. NaOH 36 Bé. There are then dissolved in this solution at 80°, with stirring, 165 parts of sodium cumene sulphonate and 6 parts of sodium-dodecylbenzenesulphonate. After being stirred for 15 minutes, the solution is slowly cooled to 40° and dried in a spray-dryer (air-inlet temperature 150°/air outlet temperature 80°). The dye powder is subsequently rendered non-dusty by being sprayed with 3 percent by weight of a mixture of 95 percent by weight of mineral oil and 5 percent by weight of dissolved sodium dioctylsulphosuccinate. There is obtained a dye powder composed of 40 percent by weight of the dye mentioned above, 55 percent by weight of sodium cumene sulphonate, 2 percent by weight of sodium dodecylbenzenesulphonate and 3 percent by weight of the mixture of 95 percent by weight of mineral oil and 5 percent by weight of sodium dioctylsulphosuccinate. The dye powder is very readily soluble in cold water (60 g/l at 20° compared with 5 g/l for the dye diluted with conventional fillers) and is easily wetted.

EXAMPLE 8

60 parts of the dye of the formula

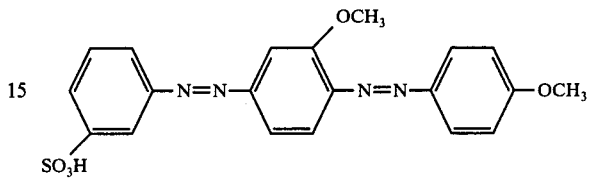

in the form of an aqueous press cake (dry content 50%) are dissolved in 400 parts of warm water at 90°, and the solution is brought to pH 9.5 with 3.1 parts of conc. NaOH 36° Bé. To this solution there are then added at 85°, with stirring, 30 parts of sodium cumene sulphonate and 156 parts of the 35% aqueous solution of the tetrasodium salt of N(1,2-dicarboxyethyl)-N-octadecylsulphosuccinamate. After 10 minutes' stirring at 80°, the solution is dried in a drying chamber at 110° in 12 hours. The dried product is then ground to powder and this is rendered non-dusty with 1 percent by weight of lauryl chloride. There is obtained a dye powder composed of 26.0 percent by weight of the dye given above, 26.0 percent by weight of sodium cumene sulphonate as well as 47 percent by weight of the tetrasodium salt of N-(1,2-dicarboxyethyl)-N-octadecyl-sulphosuccinamate and 1 percent by weight of lauryl chloride, which dye powder dissolves very readily in cold water (30 g/l at 20° compared with 10 g/l at 20° for the dye diluted with conventional fillers) and is very easily wetted in water.

EXAMPLE 9

19.8 parts of the optical brightener of the formula

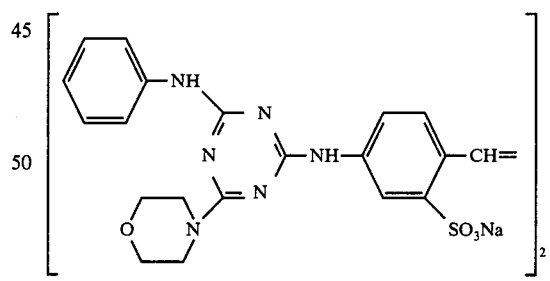

are dissolved in 120 parts of warm water at 80°, and the pH-value of the solution is adjusted to 10 with 1 part of conc. NaOH 36° Bé. There are then dissolved in this solution at 80°, with stirring, 9.2 parts of sodium cumene sulphonate and 1 part of sodium-dodecylbenzenesulphonate. After 15 minutes' stirring, the solution is slowly cooled to 40° and dried in a spray-dryer (air-inlet temperature 160°; air-outlet temperature 80°). The optical-brightener powder is then rendered non-dusty by being sprayed with 1 percent by weight of lauryl chloride.

There is obtained a powder composed of 65.4 percent by weight of the above-given optical brightener, 30.4 percent by weight of sodium cumene sulphonate, 3.2 percent by weight of sodium-dodecylbenzenesulphonate and 1 percent by weight of lauryl chloride. This powder has an improved solubility in cold water (20 g/l at 20° compared with <5 g/l for the optical brightener diluted with conventional fillers) and good wettability in water.

We claim:

1. A solid preparation, soluble in cold water, manufactured by a process comprising the steps of dissolving at least one anionic dyestuff or optical brightener and at least one anionic compound having hydrotropic activity, selected from the group consisting of

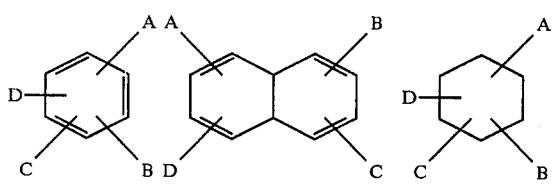

wherein A, B, C and D are each independently hydrogen, $SO_3Na$, $SO_3K$, $COONa$, $COOK$, $OH$, $NO_2$ or alkyl of 1 to 9 carbon atoms, provided that at least one of A, B, C and D is $SO_3Na$, $SO_3K$, $COONa$ or $COOK$, in water at 20° to 95° C at a pH-value of 4.5 to 11.5, and allowing the solution to evaporate to dryness.

2. Preparation soluble in cold water according to claim 1, which preparation contains
  a. 1 to 95 percent by weight of the anionic dye, or optical brightener,
  b. 5 to 99 percent by weight of at least one anionic compound having hydrotropic activity.

3. Preparation soluble in cold water according to claim 1, which preparation contains as the anionic compound having hydrotropic activity: xylene sulphonate, sodium benzoate, cumene sulphonate or 3-hydroxy-2-naphthoate.

4. Preparation soluble in cold water, according to claim 1, which pareparation further contains an anionactive solubilizing agent, selected from the group consisting of alkali metal salts or ammonium salts of N-(1,2-dicarboxyethyl)-N-octadecyl-sulphosuccinamate, N-alkyl-($C_{12}$–$C_{18}$)-sulphosuccinamate, alkyl-($C_{12}$–$C_{18}$)-imidazolinedisulphonate, 1-benzyl-2-heptadecyl-benzimidazole-mono- or -disulphonate, alkyl-($C_9$–$C_{18}$)-benzenesulphonate, alkyl-($C_8$–$C_{18}$)-sulphate, alkyl-($C_8$–$C_{18}$)-ethylene glycol ether-(1 to 100 moles of ethylene oxide)-sulphate, olefin-($C_8$–$C_{18}$)-sulphonate, alkyl-($C_8$–$C_{20}$)-sulphonate and mono- and dialkylsulphosuccinates of the general formula

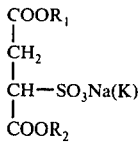

wherein
  $R_1$ represents alkyl-($C_4$–$C_{18}$), Na, K and
  $R_2$ represents alkyl-($C_4$–$C_{18}$), —$CH_2$—$CH_2$—($CH_2CH_2O)_n$-alkyl-($C_8$–$C_{18}$), N = 1-200, —$CH_2CH_2NH$-CO-alkyl-($C_8$–$C_{18}$), saturated or unsaturated.

5. Preparation soluble in cold water according to claim 4, which preparation contains as solubilising agent: dodecylbenzenesulphonate or N-(1,2-dicarboxyethyl)-N-octadecylsulphosuccinamate.

6. Preparation soluble in cold water, according to claim 1, which preparation further contains 0.2 to 10 percent by weight of an anti-dust agent.

7. Preparation soluble in cold water according to claim 6, which preparation contains as anti-dust agent a compound of the formula $$R—(Hal)_n$$

wherein
  R = straight-chain or branched-chain alkyl ($C_5$–$C_{30}$),
  Hal = Cl, F, Br and
  n = 1 to 3.

8. Preparation soluble in cold water according to claim 7, which preparation contains as anti-dust agent lauryl chloride.

9. Preparation soluble in cold water according to claim 6, which preparation contains 0.2 to 10 percent by weight of an anti-dust-agent mixture consisting of 70 to 99.9 percent by weight of an anti-dust agent and 0.1 to 30 percent by weight of a compound enhancing wettability.

10. Preparation soluble in cold water according to claim 9, which preparation contains, combined with the anti-dust agent, as compounds enhancing wettability: dialkylsulphosuccinates of the general formula

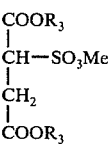

wherein the $R_3$'s represent, independently of one another, alkyl $C_8$–$C_{12}$ and Me is Na, K, $NH_4$, mono-, di or trialkanolamine ($C_2$–$C_3$); or fluorine-containing, anionactive or nonionic surface-active agents and combinations thereof.

11. The solid preparation of claim 1, wherein the water solution is prepared by combining the anionic compound having hydrotropic activity with the aqueous solution of the dyestuff or optical brightener as obtained from the last synthesis step, without isolation of the dyestuff or optical brightener therefrom.

* * * * *

UNITED STATES PATENT AND TRADEMARK OFFICE
CERTIFICATE OF CORRECTION

PATENT NO. : 4,105,401
DATED : August 8, 1978
INVENTOR(S) : Zdenek Koci et al.

It is certified that error appears in the above—identified patent and that said Letters Patent are hereby corrected as shown below:

Claim 1, at column 9, line 20, the second structure,

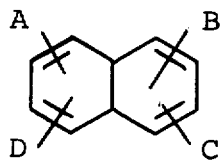 , should be 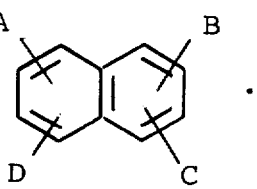 .

Signed and Sealed this

Nineteenth Day of June 1979

[SEAL]

Attest:

RUTH C. MASON
Attesting Officer

DONALD W. BANNER
Commissioner of Patents and Trademarks